Patented Dec. 26, 1933

1,940,689

UNITED STATES PATENT OFFICE 1,940,689

MANUFACTURE OF PHOSPHORIC ACID

George F. Moore, Tampa, Fla., assignor to U. S. Phosphoric Products Corporation, New York, N. Y., a corporation of Delaware No Drawing. Application April 6, 1932
Serial No. 603,684

5 Claims. (Cl. 23—165)

This invention relates to improvements in existing processes of making phosphoric acid and more particularly to a method of controlling the rate of settling of the solids formed in the so-called Dorr continuous countercurrent decantation process of making phosphoric acid involving the treatment of phosphate rock with sulphuric acid.

Many processes have been used for making phosphoric acid but the one in largest commercial use is the one known as the Dorr process or the continuous countercurrent decantation system. In this system as usually practiced, three agitator tanks are arranged in series, the last tank delivering into the first of a series of decanters. Ground phosphate pebble or rock is mixed with sulphuric acid of 75% strength diluted to 31 to 35% strength with water or dilute phosphoric acid of about 15% strength which is obtained as a product at another stage of the operation. No heat is applied but an amount of heat sufficient to raise the temperature of the mixture to 140° to 150° F. is generated in the process by the chemical reaction. The mixture is formed in the first agitator tank and passes from it into the second and then into the third agitator tank. The mass is stirred vigorously in each of the tanks by means of rotating paddles or air blast or both.

The overflow from the third and last agitator then passes into the first of the series of decanters. The solids pass progressively through the decanters and water flows through the decanters in the opposite direction to the course of the solids. Dilute phosphoric acid is drawn off from the first decanter and concentrated and the heavy sludge is drawn off from the last decanter and sent to the waste pile or, in the best of modern practices, filtered or centrifuged.

The phosphate rock consists primarily of tricalcium phosphate, $Ca_3(PO_4)_2$, which reacts with sulphuric acid to form phosphoric acid and calcium sulphate according to the following equation:

$$Ca_3(PO_4)_2 + 3H_2SO_4 = 2H_3PO_4 + 3CaSO_4$$

The calcium sulphate usually crystallizes out with two molecules of water of crystallization and is known as gypsum.

The above is a brief description of the Dorr process as commonly practiced and as the process and apparatus used is well known in the art it is not deemed necessary to describe it in more detail or to illustrate the apparatus.

In the Dorr process practiced as above described a great deal of trouble has been encountered due to variations and irregularities in the speed of settling of the solids in the decanters and particularly with respect to the gypsum which forms the major part of the solids. If the solids settle too fast, they form too thick a mud which clogs the pipe lines and the pumps often resulting in shut-downs of the plant. If the solids do not settle rapidly enough, suspended solids may decant with the phosphoric acid from the first decanter making the purification and concentration of the phosphoric acid more difficult and expensive; at the same time, the sludge comprising the solids will be too liquid and will carry phosphoric acid away with it with consequent loss of phosphoric acid from the system, and the sludge reaching the filters or centrifuges will be of such a character as to be difficultly filterable, with a consequent decrease in the capacity and efficiency of the filters and of the plant. However, the most serious effect of the too slow settling of the solids is that this mass of finely divided and highly suspended solids will after a time, say ten hours, suddenly agglomerate and quickly settle in the decanter, thereby overloading it and the pump generally used for removing the sludge therefrom thus bringing about a shut-down of the plant until this overload can be removed. These disadvantages then result, as above pointed out, from the too rapid or too slow settling of the suspended solids which primarily consist of crystals of calcium sulphate.

One of the objects of my invention comprises a modification of the process above described to cure the above recited disadvantages and undesirable features thereof and more particularly to control the rate of settling of the solids therein.

Other objects and advantages of my process will readily appear from the following detailed description thereof in which an advantageous method of practicing my invention will be particularly pointed out and the scope thereof will be indicated in the claims appended hereto.

I have discovered that the size of the calcium sulphate crystals formed will vary in such a process and that the rate of settling of the solids depends upon the size of the crystals. My invention depends on this discovery and consists in a method of regulating the size of such crystals by modifying the usual process as will be hereinafter described.

It is well known to be the general rule that rapid chemical action, such as is produced by thorough mixing and quick precipitation of materials, ordinarily produces small crystals while less rapid chemical action produces larger crystals; or, in other words, that the size of the crystals produced by chemical action with resultant precipitation varies inversely with the speed of the action and precipitation. I have discovered that the reverse of the above is true when phosphate rock is treated with sulphuric acid. That is to say, I have discovered that, when phosphate rock is treated with sulphuric acid, the size of the calcium sulphate crystals formed thereby will vary with the speed of the reaction, being large when the reaction is rapid and smaller when the reaction is slower. This result was entirely unexpected as it is contrary to the usual result produced by similar reactions and has not heretofore been recognized by those skilled in the art.

It is possible to control the speed of reaction and therefore the size of the calcium sulphate crystals formed to some extent by regulation of the temperature, concentration and the amount of sulphuric acid. These methods of control are, however, insufficient to obtain the control desired. Moreover such methods are costly and inefficient and require expensive apparatus and modification of existing apparatus. Also, when it is attempted to control the speed of the reaction by control of the concentration and the amount of the sulphuric acid, new problems in the purification of the phosphoric acid are met with and there is great danger of loss of phosphoric acid. Furthermore, it has been found, through years of experimentation and development, that the temperature, concentration and amount of sulphuric acid as commonly used in the Dorr system is the most efficient and satisfactory and that any substantial variation in any of these elements produces a correspondingly substantial decrease in the efficiency of the process and there are limits to the variations which can be made in these elements in any case which cannot be exceeded and still retain a practically operative process.

I have discovered a method of controlling the speed of reaction and the size of the calcium sulphate crystals which is certain, accurate and direct and which does not involve any change in the temperature, concentration or amount of sulphuric acid thereby obviating the many objectionable features thereof.

According to my invention, I regulate the speed of the reaction and the size of the calcium sulphate crystals by control of the fineness of the phosphate rock, pebble or other phosphatic material. For example, with an ordinary grade of phosphate pebble (Florida land pebble) and using wet grinding, good results are obtained when the pebble is ground to a size where from 3½ to 4% by volume of the sludge from the ball mill will be retained on a 60 mesh screen. If the amount left on the screen reaches 4½% by volume, the calcium sulphate crystals will be too small and the resulting disadvantages previously recited will be encountered. If the amount left on the screen reaches 3% or less the grinding is too fine and the calcium sulphate crystals will be too large with the previously recited disadvantages. Where a harder rock or pebble is used, the grinding should be finer reaching a fineness where only 1% will be retained on a 60 mesh screen with the hardest phosphate rock. Where softer pebble or phosphate material is used, it must be ground correspondingly coarser.

A second method of measurement, whereby the proper degree of grinding may be determined and controlled, comprises withdrawing a predetermined volume, say 1000 cc., of the overflow from the third agitator at the exit thereof into a suitable container, say a 1000 cc. graduate, and allowing it to stand for 30 minutes. If the calcium sulphate crystals are of the right size, the settled solids will fill the graduate to about the 750 cc. mark. This line of demarcation between the settled solids and the supernatant liquor can be easily read. This will be called the 75% settling test. If the settling test is between 70% and 80%, that is, if the line of demarcation between the settled solids and the supernatant liquid lies between 700 and 800 cc., the size of the calcium sulphate crystals may be considered to be of substantially the correct size and the plant may be expected to operate without difficulty.

If, on the other hand, the settling test is above 80%, then the crystals are too small and the grinding is not fine enough and the difficulties due to too small crystals will soon show themselves unless the operation of the mills is quickly changed to grind the rock finer. If the settling test is between 60 and 70%, the crystals are too large and the rock is being ground too fine and, unless the operation of the mills is soon changed to produce a coarser product, the difficulties due to too coarse crystals will soon show themselves. It will be understood that, where the crystals are small, they are light and occupy a large space and do not settle into a compact mass very rapidly thus causing a high reading while, where they are large, they are more compact and heavier rapidly settling to a compact mass.

While the samples for the tests made according to this second described method of testing are preferably taken from the overflow from the third agitator tank at its exit, it is apparent that the samples may be taken from the overflow of either the first or second agitator tanks allowing for the difference in the condition of the material at these points. For example, if the samples are taken from the overflow from the second agitator tank, the settling test will give a reading of 4 to 5% higher than when the samples are taken from the overflow of the third tank. However, when the samples are taken from other points than at the overflow from the third agitator tank, the tests will give a less accurate and efficient control of the process.

The control of the speed of the reaction and of the size of the calcium sulphate crystals is best obtained by the proper control of the grinding of the phosphatic material furnished to the first agitator as previously described, that is, by the operator setting his mill to grind coarser where the settling test is too low and by setting the mill to grind finer where the settling test is too high. However, as a temporary expedient, the operator may split the feed of the phosphatic material so that only a part of it will pass into the first agitator and the rest will pass into the second agitator thereby decreasing the speed of the chemical reaction. Also, as a temporary expedient, the operator may allow all of the phosphatic material to pass into the first agitator as usual and split the feed of the sulphuric acid, allowing only a part of the acid to pass into the first agitator and the rest to pass into the second agitator. As a third temporary expedient, the operator, where he is using two mills for grinding the phosphatic material, may overload one mill and underload the other mill while keeping the total load constant. A still further expedient would be for the operator to allow the overflow from the second agitator to flow directly into the first decanter without passing through the third agitator and shunting away, at least in part, the product from the third agitator. All of these expedients are for the purpose of temporarily decreasing the rate of the chemical reaction to prevent any interruption in the operation and production of phosphoric acid in the plant although they handicap the production of the plant to some extent and decrease the efficiency thereof for the time that they are in use.

The above described settling tests are to be generally made without cooling the samples, which will ordinarily have a temperature of around 140° F. However, if it is desired to cool the samples to room temperature before settling, the time of settling should be extended to one hour instead of 30 minutes to obtain approximately the same settling test.

I have also found, by means of careful analyses, that the amount of waste phosphate, i. e., phosphate material insoluble in ammonium citrate solution, will vary with the settling tests heretofore described. For example, where the settling tests were between 85% and 90% over a period of several hours, 2.5% insoluble phosphate calculated on the dry basis was found in the waste sludge delivered from the last decanter. This is much too great a waste to be permitted in the efficient operation of a plant. On the other hand, it was found that, when a settling test of 75% was obtained, the waste phosphate amounted to but slightly more than 1%.

Thus it will be seen that, while the rate of chemical reaction is ordinarily increased in order to produce small crystals in reactions of this type, I decrease the rate of chemical reaction in order to produce smaller crystals which is the reverse of the ordinary procedure.

It will also be seen that I have provided a new way of controlling the speed of chemical reactions of this type and of controlling the size of crystals formed by such a reaction.

It will be understood that, by the above method of operation, production may be continued for long periods of time as, there being no objectionable strains on the machinery, there will, consequently, be few repairs and few or no breakdowns, and that the maximum production of the plant will be its customary rate of operation.

While I have described a process of controlling the speed of chemical reaction and the size of the crystals formed thereby in a particular process, it will be understood that my invention is not necessarily limited to its use in such a process but that it is of more or less general application to other and similar processes and the scope of the invention will be indicated in the following claims and is not to be considered as limited except by such claims and the prior art.

I claim:

1. In a continuous countercurrent decantation process of manufacturing phosphoric acid from phosphatic material by the use of sulphuric acid, the step which comprises increasing the size of the calcium sulphate crystals formed therein by decreasing the size of particles of phosphatic material entering the process.

2. In a decantation process of making phosphoric acid, the step which comprises controlling the rate of settling of solids formed therein by regulating the fineness of grinding in the wet way of the phosphatic material to be treated so that the volume percent of ground material retained on a 60 mesh screen will be between 3 and 4½% of a sludge sample taken from the grinding mill.

3. In the process of making phosphoric acid by treating finely ground phosphatic material with sulphuric acid with the formation of calcium sulphate crystals, the method of decreasing the size of the crystals which comprises increasing the size of the particles of the phosphatic material.

4. In the process of making phosphoric acid by treating finely ground phosphatic material with sulphuric acid with the formation of calcium sulphate crystals, the method of controlling the size of the crystals which comprises decreasing the size of the particles of the phosphatic material to increase the size of the crystals and increasing the size of the said particles to decrease the size of the said crystals.

5. In the treatment of a finely divided substantially water insoluble calcium salt with diluted sulphuric acid producing calcium sulphate crystals, the step of controlling the size of the said crystals which comprises more finely dividing the calcium salt to increase the size of the said crystals.

GEORGE F. MOORE.